United States Patent [19]

Nakamura et al.

[11] Patent Number: 4,985,711

[45] Date of Patent: Jan. 15, 1991

[54] THERMAL PRINTER WITH A TENSION ROLLER

[75] Inventors: Hisashi Nakamura, Fukuyama; Hiroshi Fukumoto, Amagasaki, both of Japan

[73] Assignee: Mitsubishi Denki Kabushiki Kaisha, Japan

[21] Appl. No.: 480,142

[22] Filed: Feb. 14, 1990

[30] Foreign Application Priority Data

Feb. 16, 1989 [JP] Japan .................................... 1-38835

[51] Int. Cl.5 ............................................ G01D 15/10

[52] U.S. Cl. ................................ 346/76 PH; 400/120

[58] Field of Search ..................... 346/76 PH; 400/120

[56] References Cited

U.S. PATENT DOCUMENTS 4,829,320 5/1989 Une et al. ....................... 346/76 PH

FOREIGN PATENT DOCUMENTS 0063463 4/1986 Japan ............................. 346/76 PH

*Primary Examiner*—Bruce A. Reynolds
*Assistant Examiner*—Huan Tran
*Attorney, Agent, or Firm*—Leydig, Voit & Mayer

[57] ABSTRACT

A thermal printer has a tension roller which rotates at a peripheral speed higher than that of a platen roller. A recording paper after a thermal transfer of an ink thereto is tensed by the tension roller so that separation of the transferred ink from an ink sheet is conducted at a constant separation angle, thus ensuring high uniformity of the printing quality.

6 Claims, 5 Drawing Sheets

THERMAL PRINTER WITH A TENSION ROLLER

BACKGROUND OF THE INVENTION

1. Field of the Invention

The present invention relates to a thermal printer having a paper feed mechanism which is improved to provide a uniform printing quality.

2. Description of the Related Art

FIGS. 1 and 2 are a schematic side elevation and a schematic plan view of a color thermal printer of the type which is shown in, for example, the specification of Japanese Patent Application No. 62-147241 corresponding to U.S. Pat. No. 4,829,320.

Referring to these figures, a pair of first pulleys 2 is attached to both ends of a platen roller 1 so as to rotate together with the platen roller 1. A pair of timing belts 3 engaging with the pair of first pulleys 2 is stretched by a pair of second pulleys 4 and a pair of third pulleys 5. A sheet-type recording paper 6 is fed between the first pulleys 2 and an ink sheet 7 for supplying an ink. A thermal head 8 disposed in the vicinity of the first pulleys 2 is capable of transferring ink from the ink sheet 7 to the recording paper 6 in accordance with an electrical signal. A bridge **9*a* extending in parallel with the platen roller 1 between both timing belts 3 is provided with a clamper 9 which clamps an end of the recording paper 6 and runs in synchronization with the timing belt 3**.

In the known thermal printer having the described construction, the recording paper 6 is supplied from a paper supplying mechanism (not shown) so that the leading end of the recording paper 6 is passed through the clearance between the platen roller 1 and the thermal head 8 so as to be clamped by the clamper 9. As a printing instruction is given, the thermal head 8 is pressed against the platen roller 1 with the recording paper 6 and the ink sheet 7 placed therebetween. Then, the platen roller 1 starts to rotate in the direction of arrow A so as to thermally transfer the ink from the ink sheet 7 to the recording paper 6 in accordance with the electrical signal. The ink sheet with the printing coloring agent transferred thereto is taken up by the take-up reel 7*a*. At the same time, the timing belt 3 is made to move in the direction of arrow B so as to convey the leading end of the recording paper clamped by the clamper 9. When the clamper 9 reaches the first pulleys 2 after passing the second pulleys 4 and the third pulleys 5, the thermal head 8 is spaced apart from the platen roller 1 to allow the clamper 9 to pass through the gap between the platen roller 1 and the thermal head 8. In this state, the ink sheet 7 is set up for the next color. When the clamper 9 is again brought to the print start position, the thermal head 8 is made to contact again with the platen roller 1 so that the printing with the second color is performed in the same manner as that described before.

This operation is repeated with third and fourth colors so that a color print is completed. The recording paper 6 is then separated from the clamper 9 and ejected.

In the above-described printing operation, when the peripheral speed of the platen roller 1 equals the running speed of the timing belt 3, the portion of the clamper 9 clamping the recording paper 6 temporarily exhibits a greater speed than the peripheral speed of the platen roller 1, because it moves along a path which has a radius greater than that of the pulleys 4, 5 during turning around these pulleys 4, 5, so that the recording paper 6 is pulled in the direction of movement. The resulting tensile force causes a variation in the speed of movement of the recording paper 6 at the printing position where the thermal head opposes the platen roller 1, resulting in an offset or mis-registration in the printing.

In order to obviate this problem, a method has been proposed in which the peripheral speed of the platen roller 1 is selected to be slightly greater than the speed of the timing belt 3. In such a method, however, slack **6*a* is caused in the recording paper 6 with respect to the timing belt 3 in an amount proportional to the length over which the recording paper 6 passes while thermal transfer is performed. This slack 6*a* absorbs any fluctuation in the movement of the recording paper 6 at the printing position at the moment at which the clamper 9 passes over the pulleys 4 or 5. Unfortunately, however, this slack 6*a* progressively grows large, so that when the recording paper 6 after the thermal transfer is separated from the ink sheet 7, the recording paper 6 is undesirably attracted by the ink sheet 7 by an amount corresponding to the amount of the slack 6*a***, with the result that the angle at which the paper is separated from the ink sheet fluctuates undesirably.

Thus, in the known thermal printer of the type in which the speed of the timing belt is less than the peripheral speed of the platen roller 1, the slack **6*a*** caused by the difference in the speed is progressively increased to cause a variation in the angle at which the ink is separated from the ink sheet after the thermal transfer, resulting in a fluctuation in the printing quality.

SUMMARY OF THE INVENTION

Accordingly, an object of the present invention is to provide a thermal printer in which the separation of the ink from the ink sheet after the thermal transfer is maintained constant so as to ensure a uniform printing quality, thereby overcoming the above-described problems of the prior art.

To this end, according to the present invention, there is provided a thermal printer comprising: an ink sheet for supplying an ink; a platen roller for keeping the ink sheet in close contact with a sheet-type recording paper; a pair of first pulleys attached to both ends of the platen roller; a pair of timing belts wound around the first pulleys and capable of running in the same direction as the direction of rotation of the platen roller at a speed lower than the peripheral speed of the platen roller 1, the timing belts having a circumferential length greater than the length of the recording paper; second pulleys for stretching the timing belts; a clamper provided between the timing belts and capable of clamping an end of the recording paper; a thermal head for pressing the platen roller across the recording paper and the ink sheet which are held in close contact with each other so as to thermally transfer the ink from the ink sheet to the recording paper; and a tension roller rotatable at a peripheral speed higher than the peripheral speed of the platen roller so as to tense the recording paper separated from the ink sheet after the thermal transfer of the ink.

The above and other objects, features and advantages of the present invention will become clear from the following description of the preferred embodiment when read in conjunction with the accompanying drawings.

DESCRIPTION OF THE PREFERRED EMBODIMENTS

Figure 1:
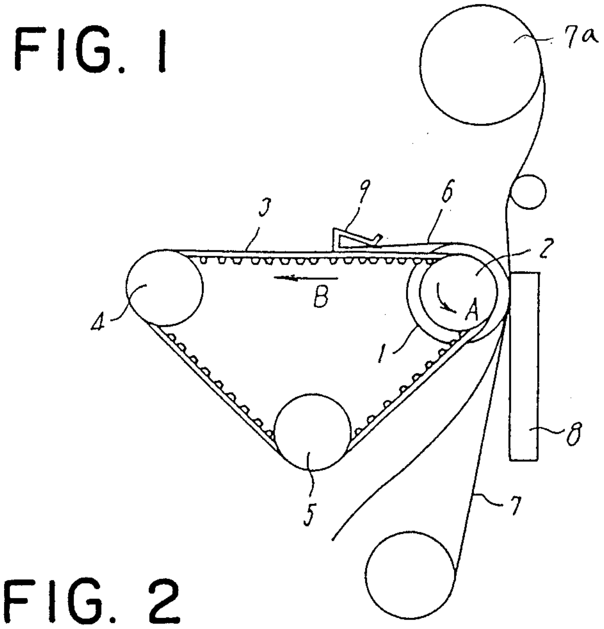
FIGS. 1 and 2 are a schematic side elevation and a schematic plan view of an essential portion of a paper feeding mechanism of a conventional thermal printer.
Figure 2:
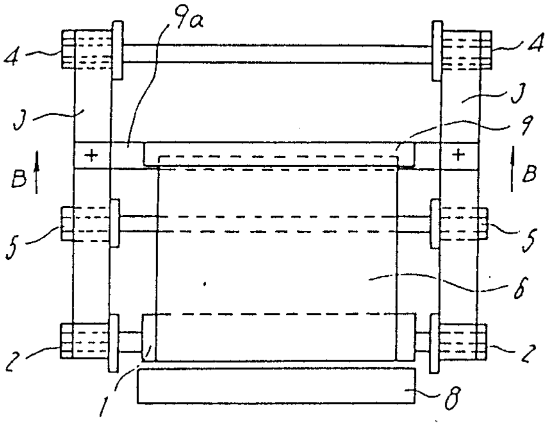
Figure 3:
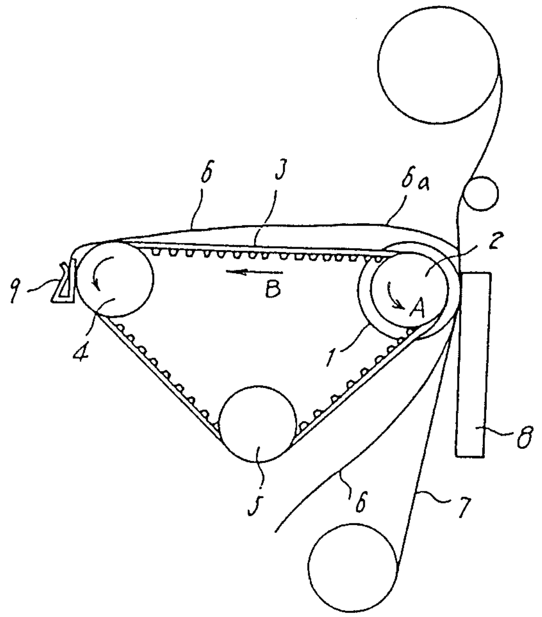
FIG. 3 is a schematic side elevation showing the operation of the conventional thermal printer of FIG. 1.
Figure 4:
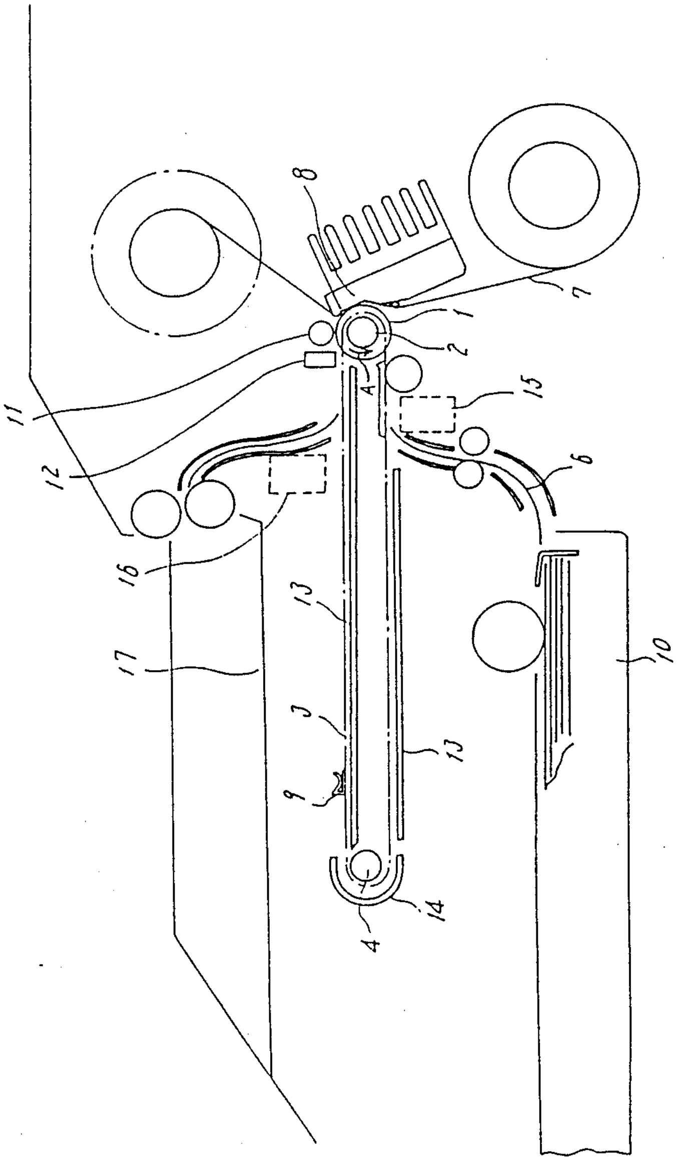
FIGS. 4 and 5 are a schematic side elevation and a schematic plan view of an embodiment of the thermal printer in accordance with the present invention.
Figure 5:
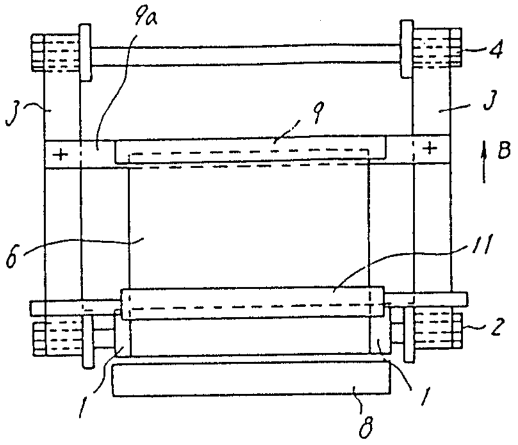

In FIGS. 4 and 5 which are a schematic side elevation and a schematic plan view of an embodiment of the thermal printer of the present invention, reference numerals 1 to 4 and 6 to 9 denote the same parts or components as those denoted by the same reference numerals of the conventional thermal printer explained before in connection with FIGS. 1 and 2. In this embodiment, the peripheral speed of the platen roller 1 is higher than the speed of movement of the timing belt 3, although the speed difference is only slight. A paper supplying mechanism 10 is disposed at a lower portion of the thermal printer and is capable of supplying recording paper 6 sheet by sheet from a stack thereof. A tension roller 11 is driven to develop a peripheral speed which is slightly higher than that of the platen roller 1 and is pressed against the platen roller 1 so as to pull the recording paper 6 after the thermal transfer in the direction of movement of the timing belt 3 (arrow B), thereby tensioning the recording paper 6. A paper sensor 12 is capable of sensing the leading end of the recording paper 6. The recording paper 6 which is fed along the timing belt 3 is protected by paper guides 13 and 14. The leading end of the recording paper 6 supplied from the paper supplying mechanism is clamped by a clamper 9 by the action of a clamp actuating mechanism 15. The recording paper 6 after completion of the printing is released from the clamper 9 by the action of an unclamping mechanism 16, before it is delivered to an ejection tray 17. When the printing operation of the thermal printer is commenced, the clamper 9 is set at an initial position which is above the clamping mechanism 15. The leading end of the recording paper 6 which has been supplied from the paper supplying mechanism 10 is inserted between the claws of the clamper 9. When this state is sensed by a sensor (not shown), the clamping mechanism 15 is started to close the clamper 9 so that the leading end of the recording paper 6 is clamped by the clamper 9 and, thereafter, the platen roller 1 starts to rotate in the direction of the arrow A. In this state, the thermal head 8 and the tension roller 11 have been separated from the platen roller 1 so that the clamper 9 is advanced to the position of the paper sensor 12. When the arrival of the leading end of the recording paper 6 is sensed by the paper sensor 12, the thermal head 8 and the tension roller 11 are brought into contact with the platen roller 1 so that printing is commenced. The clamper 9 is fed by the timing belt 3 so that the recording paper also is fed forward while the thermal transfer is being performed. When the clamper 9 has reached the position of the clamping mechanism 15 past the second pulleys 4, the thermal head 8 and the tension roller 11 are spaced apart from the platen roller 1 so that the ink sheet 7 is set up for the next printing color, thus enabling printing in the second color. This operation is repeated three or four times so as to complete the required color printing. Thereafter, when the clamper 9 reaches the position of the unclamping mechanism 16, the unclamping mechanism 16 operates to cause the clamper 9 to release the leading end of the recording paper 6, so that part of the paper guide 13 guides the leading end of the recording paper 6 to the ejection tray 17. In this printing operation, slack in the recording paper 6 is generated due to the difference between the speed of the timing belt 3 and the peripheral speed of the platen roller 1 before the clamper 9 clamping the leading end of the recording paper 6 reaches the position of the second pulleys 4, and this slack absorbs any fluctuation in the running speed of the printing paper 6 at the printing position which is caused when the clamper 9 passes over the second pulleys 4. Since the peripheral speed of the tension roller 11 is slightly higher than that of the platen roller 1, the tension roller 11 exerts a feeding force on the recording paper 6. This feeding force serves to maintain a constant separation between the recording paper 6 and the ink sheet 7. It is therefore possible to maintain the angle of separation between the ink and the ink sheet 7 constant.

Figure 6:
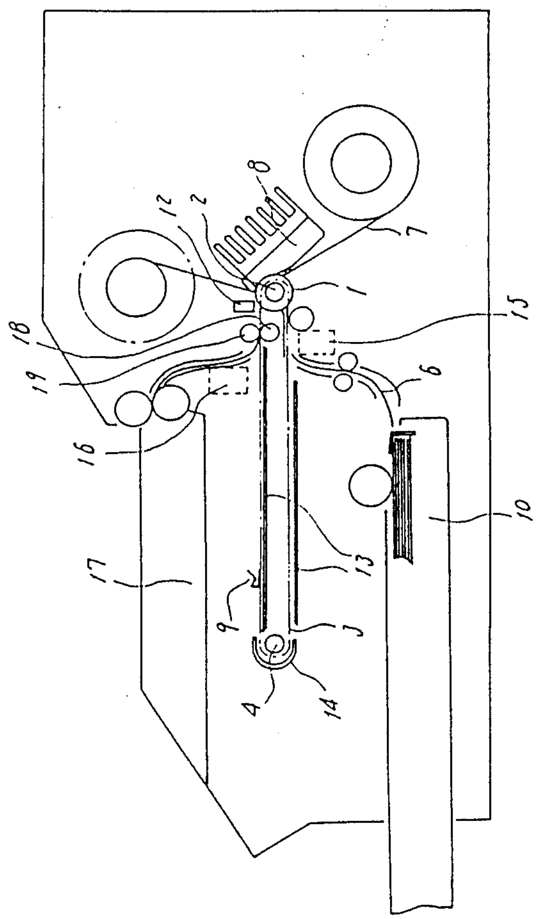
FIG. 6 is a schematic side elevation of another embodiment of the thermal printer of the present invention.

FIG. 6 is a side elevation of an essential portion of another embodiment of the thermal printer in accordance with the present invention. In this figure, numerals 1 to 4, 6 to 10 and 12 to 17 denote parts or components of the preceding embodiment which are the same as those denoted by the same reference numerals. The embodiment shown in FIG. 6 also is designed such that the peripheral speed of the platen roller 1 is higher than the speed of the timing belt 3. The recording paper 6 after the thermal transfer is tensed by a first tension roller 18 and is fed by the same in the direction of movement of the timing belt 3. This embodiment has a second tension roller 19 which contacts the first tension roller 18 and which assists the feeding of the recording paper 6. This second tension roller 9 is separated from the first tension roller 18 when the clamper 9 passes the position of the second tension roller 19. The first tension roller 18 contacts the portion of the recording paper 6 where there is no image, and rotates at a speed which is slightly higher than the peripheral speed of the platen roller 1. The difference in the speed is absorbed by slipping which is allowed between the first tension roller 18 and the recording paper 6. Therefore, a stable tensile force is applied to the portion of the recording paper 6 between the printing position and the tension roller 18 so that the separation of the ink from the ink sheet is conducted stably at a constant angle. Since the tension roller 18 slips only on the region where there is no image, there is no risk of the print image being contaminated or damaged by the tension roller 18.

Although the invention has been described with respect to preferred embodiments, it is to be understood that the described embodiments are only illustrative and various changes and modifications may be imparted thereto without departing from the scope of the present invention which is limited solely by the appended claims.

What is claimed is:

1. A thermal printer comprising:

an ink sheet for supplying an ink;

a platen roller for keeping said ink sheet in close contact with a sheet-type recording paper;

a first pulley attached to said platen roller;

a timing belt wound around said first pulley and capable of running in the same direction as the direction of rotation of said platen roller at a speed lower than the peripheral speed of said platen roller, said timing belt having a circumferential length greater than the length of said recording paper;

a second pulley for stretching said timing belt;

a clamper connected to said timing belt for clamping an end of said recording paper;

a thermal head for pressing said recording paper and said ink sheet against said platen roller to thermally transfer said ink from said ink sheet to said recording paper; and a first tension roller rotatable at a peripheral speed higher than the peripheral speed of said platen roller to apply tension to said recording paper after the thermal transfer of said ink.

2. A thermal printer according to claim 1 further comprising a second tension roller disposed on the opposite side of said recording paper from said first tension roller in contact with said recording paper.

3. A thermal printer according to claim 1 designed for performing printing of a color image.

4. A printer comprising:

a rotatable platen;

a pulley connected to the platen and having a smaller diameter than the rotatable platen;

an endless timing belt wound around the pulley;

a thermal head posed in the vicinity of the platen;

an ink sheet disposed between the thermal head and the platen;

a clamper secured to the timing belt for grasping a piece of recording paper and pulling the recording paper between the ink sheet and the platen as the platen rotates; and a tension roller for pressing a piece of recording paper grasped by the clamper against the platen after the recording paper has passed between the ink sheet and the platen, the tension roller being rotated at a speed such that the peripheral speed of the tension roller is greater than the peripheral speed of the platen.

5. A printer as claimed in claim 4 wherein the tension roller is movable between a position in which it is pressed against the platen and a second position in which it is sufficiently separated from the platen for the clamper to pass between the tension roller and the platen.

6. A printer for forming an image on recording paper comprising:

a rotatable platen;

a pulley connected to the platen and having a smaller diameter than the platen;

an endless belt wound around the pulley;

a thermal head posed in the vicinity of the platen;

an ink sheet disposed between the thermal head and the platen;

a clamper secured to the belt for grasping a piece of recording paper and pulling the recording paper between the ink sheet and the platen; and first and second rotatable tension rollers movable relative to each other between first positions in which the clamper can pass between the tension rollers and second positions in which both tension rollers are in contact with opposite sides of a sheet of recording paper grasped by the clamper after the recording paper has passed between the ink sheet and the platen, at least one of the tension rollers being rotated so that its peripheral speed is higher than the peripheral speed of the platen.

* * * * *